Patented May 27, 1947

2,421,093

UNITED STATES PATENT OFFICE 2,421,093

METHOD OF MAKING NONRIGID GELS

Donald R. Thompson, Ontario, Calif., assignor to California Fruit Growers Exchange, Los Angeles, Calif., a corporation of California No Drawing. Application February 18, 1942,
Serial No. 431,383

5 Claims. (Cl. 99—132)

This invention has to do with the art of making jellies and is more particularly concerned with processes for preparing jellies having special characteristics rendering them peculiarly suitable for use in connection with bakery goods, such as coffee cakes, jelly rolls, filled doughnuts, et cetera.

Jellies made by the aid of pectin have been known for many years, since it was discovered that pectin constituted the jelly-forming component of fruits. During this time processes for the extraction of pectin from its source materials and processes for making jellies from such pectin have been developed with the view of preparing jellies having so-called "standard" characteristics. Thus all concerned have been devising means and methods for producing jellies having more or less rigidity, elasticity, ability of maintaining shape in a molded piece of reasonable size, freedom from syneresis, and ability to retain cut edges. Such qualities were referred to in grading jellies, and indeed are regarded by all as constituting the substances which, by definition, are called jellies.

Such standard textured jellies, when crushed, as in spreading, are broken down into small but discernible chunks, whose characteristics are similar to those of the larger piece. The crushed mass thus does not present a smooth, uniform appearance, but resembles, say, clabbered milk. For special uses, and in this application the special uses are disclosed as those made by bakers, it is desirable to have the spread jelly exhibit an appearance similar to that of jam. This appears to be largely a matter of preference on the part of the consuming public, but is also desirable from the standpoint of ease of spreading, since the satisfactory breaking down of standard textured jellies is a matter of considerable manipulation. It is one matter merely to spread a material like jam, and an entirely different matter to make sure that all the lumps are crushed when a normal jelly is spread.

To my knowledge no one has heretofore proposed that a pectin be so treated, either in its production or in preparing it in the course of making jellies, that a jelly having what I call a "salvy" texture will be produced. By the term "salvy" texture, I intend to describe a jelly having spreading properties substantially similar to that of jams, and being semi-solid, and non-elastic, but not syrupy.

It is an object of my invention to provide a process whereby in the commercial production of pectin, the pectin may be so modified as to have the property, when made into jelly by ordinary procedures, to produce only jellies having the salvy texture I have described.

It is a further object to provide a process for making salvy textured jellies from pectins now available on the market.

A third object is to make available, for use by bakers and others interested in similar applications of jelly, jellies having especially desirable characteristics, different from those commonly produced.

One manner in which to prepare salvy jellies, and one which makes use of pectin as commonly available commercially, is exemplified in the following. The conventional jelly-making procedure involves a period of boiling for the purpose of getting the ingredients all into solution. This boiling is continued until the desired soluble solids content is attained, and then acid is added, either to the mix or to the containers, prior to pouring. I have found that a salvy jelly will result if, during at least a portion of the time of boiling of the solution containing the pectin, the pH of the solution be maintained somewhere between 4.0 and 7.0 by adidtion of suitable buffer or alkali. A jelly batch was made as follows:

| | |
|---|---|
| 100 grade pectin _____ grams__ | 4.11 |
| Distilled water _____ milliliters__ | 222 |
| Cane sugar _____ grams__ | 411 |
| 5% $Na_2HPO_4$ solution _____ milliliters__ | 5.4 |
| Cooked weight _____ grams__ | 633 |
| 15% phosphoric acid per standard jelly glass _____ milliliters__ | 1 |

The phosphate added produced an initial pH of 4.88 in the jelly batch, which was boiled for 10 minutes. The phosphoric acid reduced the pH to 2.6 for setting. The resultant jelly was easily crushed and it had the desired texture.

On the second trial a pH of 5.5 was maintained. This also produced a jelly having a salvy texture. Boiling was continued for 8 minutes.

Commercial scale batches of jelly are made as follows:

| | |
|---|---|
| Water _____ pounds__ | 67 |
| 100 grade pectin _____ do____ | 1.2 |
| Beet sugar _____ do____ | 100 |
| $Na_2HPO_4$ (anhydrous) _____ ounces__ | 1.75 |
| 15% phosphoric acid _____ fluid ounces__ | 12 |

In order to give 70 to 72% soluble solids content, the jelly batch, less the phosphoric acid, was cooked to 220 to 221 degrees F. The phosphoric acid was added and stirred in just prior to pouring the jelly into 30 pound containers. The jelly had the characteristics desired.

In order to demonstrate the difference between jellies made in the normal manner and jellies made in accordance with my invention, a control jelly was made according to the following formula:

| | | |
|---|---|---|
| Distilled water | liters | 2 |
| 100 grade pectin | grams | 36 |
| Cane sugar | kilograms | 3 |
| 15% $H_3PO_4$ | milliliters | 8.5 |
| Raspberry flavor | do | 3.5 |
| Red color. | | |

This jelly batch was boiled for 16 minutes to a final weight of 4.34 kg. before the phosphoric acid was added and the whole poured into containers. On testing, the jelly was found to have 71.0% soluble solids, and a pH of 2.88. The texture was standard.

Another jelly was made from the same formula with the exceptions that 25 ml. of 10% $Na_2HPO_4$ solution were added prior to boiling and just before pouring 22 ml. of the phosphoric acid was used, rather than 8.5 ml. This jelly, on testing, had a soluble solids content of 71.0% and a pH of 2.67. Its texture was salvy and, when broken down by spreading, a smooth jam-like mass was obtained.

Since jellies containing glucose offer certain difficulties not encountered in making sugar jellies, a special technique was employed to make a salvy jelly including glucose. In this the desired quantity of pectin was dispersed with a small amount of the total glucose, and boiled in water. Enough sodium hydrogen phosphate was then added to the sol to produce a pH of 4.8, and the sol was held at 200° Fahrenheit for approximately 10 minutes. Then enough of the setting acid was added to reduce the pH below 4.0 and portions of the sol used as desired in the usual manner. Jellies so obtained were found to exhibit the salvy characteristic desired.

I have used various buffer salts and alkalies to secure the necessary pH conditions for modifying the pectin during the process of jelly making. Among the buffers used are the following phosphates and citrates $Na_2HPO_4$, $K_2HPO_4$, $(NH_4)_2HPO_4$, $Na_3Cit.\cdot 2H_2O$, $K_3Cit.\cdot H_2O$, $(NH_4)_3Cit.$, $Li_3Cit.\cdot 4H_2O$. Apparently any buffer salts capable of producing the desired pH condition will be suitable, and those I have used are representative of the class. The salts exhibited various characteristics, and some require more setting acid than others, which may be undesirable in certain cases. For example, of the group of salts I have mentioned, the citrates generally require more setting acid than do the phosphates. The strong alkalies should be used with care to avoid local overconcentration.

Baking tests carried on in commercial bakeries according to the commercial procedures have established that the jellies made by my invention are much easier to spread than are jellies of standard texture heretofore used. The appearance is of a desirable brilliance. The tendency to run at temperatures used in baking is not adversely affected, and depth of penetration into the crumb is satisfactorily small.

The scope of this invention is not indicated by the examples given above, since it is impossible to specify all possible conditions under which the pectin may be treated in order to enable it to produce salvy jellies. The hydrogen ion content (pH), time of treatment, and temperature are interdependent variables, and must be so correlated as to (1) secure the desired modification of pectin without (2) destroying its jellying power. Obviously, increased amounts of reagent, resulting in higher pH values, and higher temperatures, or either of these, will give a more rapid change, thus requiring shorter times. If the time of boiling to secure salviness is less than that necessary for attaining the desired solids content, the pH may be reduced to below 4.0 to stop the modification of the pectin, though boiling be continued. Furthermore, it will be obvious to those skilled in this art that pectins from various sources and obtained by various methods will vary in their response to treatment. For example, in my work I have found that a slow-setting type is most suitable, though it is by no means impossible or even difficult to suitably modify a pectin naturally having quick-setting properties. It is certain that a pH range of 4.0 to 7.0 is suitable for treatment of pectin while making jellies or in a sol form as disclosed particularly relative to glucose jellies. Of course, the higher the pH of treatment, the more setting acid is required, while too low a pH will require an excessive length of time. Thus it will be seen that the gist of my invention resides in the treatment of pectin at any desired point in its progress from fruit to jelly whereby its characteristics are so changed that, whereas in absence of such treatment standard textured jellies would have been prepared by standard procedures, the modified pectin will produce only jellies having the salvy texture desired by bakers.

Jellies of any desired soluble solids content may be made according to my invention. Usual content ranges between 60 and 72%.

To distinguish and particularly refer to those gels having the solids content usually found in commerce under the term "jelly," I refer to such jellies by the general term "sugar jellies."

It is to be understood that where I speak of alkali treatment, I do not mean treatment necessarily above pH 7, but refer to the fact that the treatment is at a pH higher than is normal for pectin.

Having described my invention in such terms as to make it understandable by those skilled in this art, as required by the statutes, I claim:

1. A process for making a pectin sugar jelly of salvy texture comprising treating a pectin-containing jelly batch at an acidity corresponding to a pH range of 4.0 to 7.0 for from 5 to 30 minutes at 180° to 220° F., whereby a jelly of salvy texture is obtained.

2. In a process for making a sugar jelly of salvy texture in which a mixture containing pectin is boiled, the improvement comprising maintaining the pH of the mixture between 4.0 and 7.0 during a boiling period of from 5 to 30 minutes.

3. A method of making a pectin sugar jelly of salvy texture in which a pectin-containing jelly batch is boiled and during at least a portion of the time of boiling the pH of the solution is maintained somewhere between 4.0 and 7.0 by the addition of substances from the group comprising buffers and alkalis, the necessary acid to cause setting being subsequently added.

4. A method of making a pectin sugar jelly of salvy texture as claimed in claim 3 in which the solution, maintained within the stated limits of pH, is boiled for from 5 to 30 minutes.

5. The process for making a pectin sugar jelly of salvy texture to render the same suitable for use with glucose in which the desired quantity of pectin is dispersed with a small quantity of glucose and boiled in water, whereupon the pH is adjusted in about 4.8, the sol being then kept at a temperature of about 200° F. for a few minutes, after which the pH is reduced to below 4.0 by the addition of acid, and the product is used for making jelly in the normal manner.

DONALD R. THOMPSON.

REFERENCES CITED

The following references are of record in the file of this patent:

UNITED STATES PATENTS

| Number | Name | Date |
|--------|------|------|
| 2,133,273 | Cox | Oct. 18, 1938 |

FOREIGN PATENTS

| Number | Country | Date |
|--------|---------|------|
| 486,463 | Great Britain | June 3, 1938 |
| 258,595 | Italy | May 5, 1928 |

OTHER REFERENCES

Baier et al., "Citrus Pectates," Industrial and Engineering Chemistry, March 1941, pages 287 to 291, pages 288 and 289 being relied on. (Photostat in Div. 63, 99–132; copy in Scientific Library.)

Bulletin of the National Formulary Committee, pages 18, 34, and 38, October 1940, American Pharmaceutical Assoc., Washington, D. C.